(12) United States Patent
Gummadi et al.

(10) Patent No.: US 10,531,367 B2
(45) Date of Patent: Jan. 7, 2020

(54) TECHNIQUES AND APPARATUSES FOR HANDLING EXTENDED ACCESS BARRING

(71) Applicant: QUALCOMM Incorporated, San Diego, CA (US)

(72) Inventors: Bapineedu Chowdary Gummadi, Hyderabad (IN); Balaji Kannan, Hyderabad (IN); Venkata A Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 15/704,777

(22) Filed: Sep. 14, 2017

(65) Prior Publication Data

US 2019/0082380 A1 Mar. 14, 2019

(51) Int. Cl.
| | |
|---|---|
| *H04W 48/12* | (2009.01) |
| *H04W 72/04* | (2009.01) |
| *H04W 8/18* | (2009.01) |
| *H04W 48/16* | (2009.01) |
| *H04W 88/08* | (2009.01) |
| *H04W 16/32* | (2009.01) |
| *H04W 88/06* | (2009.01) |

(52) U.S. Cl.
CPC ............ *H04W 48/12* (2013.01); *H04W 8/18* (2013.01); *H04W 48/16* (2013.01); *H04W 72/0406* (2013.01); *H04W 72/0446* (2013.01); *H04W 16/32* (2013.01); *H04W 88/06* (2013.01); *H04W 88/08* (2013.01)

(58) Field of Classification Search
CPC ..... H04W 48/06; H04W 74/08; H04W 48/12; H04W 48/18; H04W 84/042; H04W 48/02; H04W 48/16; H04W 88/06
See application file for complete search history.

(56) References Cited

U.S. PATENT DOCUMENTS

| | | | |
|---|---|---|---|
| 2013/0039309 A1* | 2/2013 | Chiu ..................... | H04W 48/08 370/329 |
| 2013/0121225 A1 | 5/2013 | Ryu | |
| 2014/0080531 A1 | 3/2014 | Du et al. | |
| 2014/0128029 A1* | 5/2014 | Fong .................... | H04W 48/12 455/411 |
| 2015/0055447 A1* | 2/2015 | Jamadagni ............ | H04W 48/02 370/216 |
| 2016/0014672 A1 | 1/2016 | Jang et al. | |
| 2016/0127980 A1* | 5/2016 | Fong .................... | H04W 48/12 455/411 |
| 2018/0199273 A1* | 7/2018 | Chun .................... | H04W 48/14 |
| 2018/0317198 A1* | 11/2018 | Lee ......................... | H04W 4/70 |

* cited by examiner

*Primary Examiner* — Diane D Mizrahi
(74) *Attorney, Agent, or Firm* — Harrity & Harrity LLP/Qualcomm Incorporated

(57) ABSTRACT

Certain aspects of the present disclosure generally relate to wireless communication. In some aspects, a user equipment may receive extended access barring (EAB) information indicating whether the UE is subject to EAB. The UE may output an indication of whether the UE is subject to EAB based at least in part on receiving the EAB information. Numerous other aspects are provided.

30 Claims, 12 Drawing Sheets

TECHNIQUES AND APPARATUSES FOR HANDLING EXTENDED ACCESS BARRING

FIELD OF THE DISCLOSURE

Aspects of the present disclosure generally relate to wireless communication, and more particularly to techniques and apparatuses for handling extended access barring (EAB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may be performed by a user equipment (UE). The method may include receiving extended access barring (EAB) information indicating whether the UE is subject to EAB; and outputting an indication of whether the UE is subject to EAB based at least in part on receiving the EAB information.

In some aspects, a method for wireless communication may be performed by a user equipment (UE). The method may include receiving EAB information indicating that the UE is subject to EAB on a first network, wherein the UE is subscribed to the first network and a second network; and transmitting information via the second network based at least in part on receiving the EAB information indicating that the UE is subject to EAB on the first network.

In some aspects, a UE for wireless communication may include memory and one or more processors operatively coupled to the memory. The memory and the one or more processors may be configured to receive EAB information indicating whether the UE is subject to EAB; and output an indication of whether the UE is subject to EAB based at least in part on receiving the EAB information.

In some aspects, a UE for wireless communication may include memory and one or more processors operatively coupled to the memory. The memory and the one or more processors may be configured to receive EAB information indicating that the UE is subject to EAB on a first network, wherein the UE is subscribed to the first network and a second network; and transmit information via the second network based at least in part on receiving the EAB information indicating that the UE is subject to EAB on the first network.

In some aspects, a non-transitory computer-readable medium may store one or more instructions for wireless communication. The one or more instructions, when executed by one or more processors of a UE, may cause the one or more processors to receive EAB information indicating whether the UE is subject to EAB; and output an indication of whether the UE is subject to EAB based at least in part on receiving the EAB information.

In some aspects, a non-transitory computer-readable medium may store one or more instructions for wireless communication. The one or more instructions, when executed by one or more processors of a UE, may cause the one or more processors to receive EAB information indicating that the UE is subject to EAB on a first network, wherein the UE is subscribed to the first network and a second network; and transmit information via the second network based at least in part on receiving the EAB information indicating that the UE is subject to EAB on the first network.

In some aspects, an apparatus for wireless communication may include means for receiving EAB information indicating whether the apparatus is subject to EAB; and means for outputting an indication of whether the apparatus is subject to EAB based at least in part on receiving the EAB information.

In some aspects, an apparatus for wireless communication may include means for receiving EAB information indicating that the apparatus is subject to EAB on a first network, wherein the apparatus is subscribed to the first network and a second network; and means for transmitting information via the second network based at least in part on receiving the EAB information indicating that the apparatus is subject to EAB on the first network.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
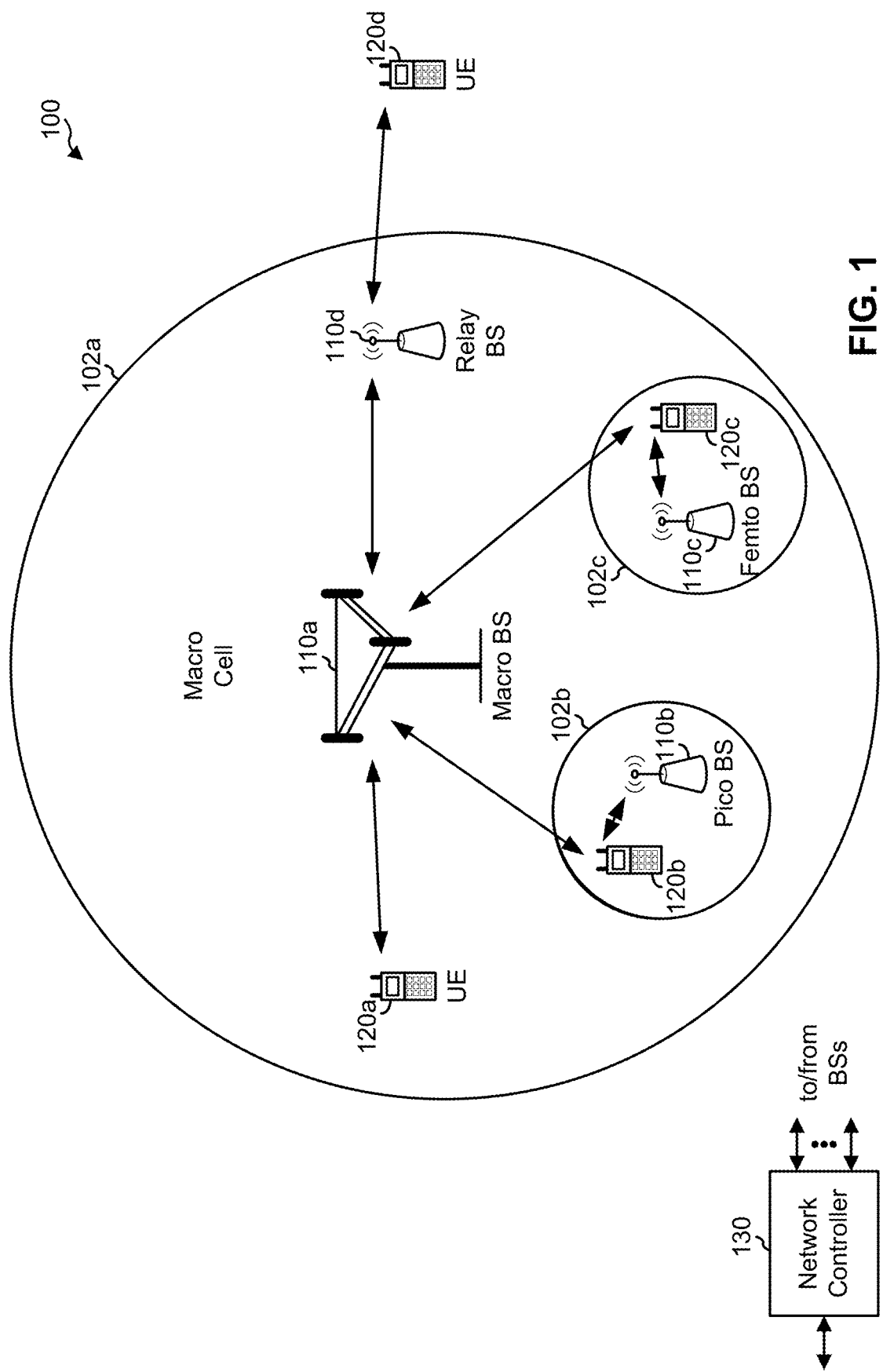
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
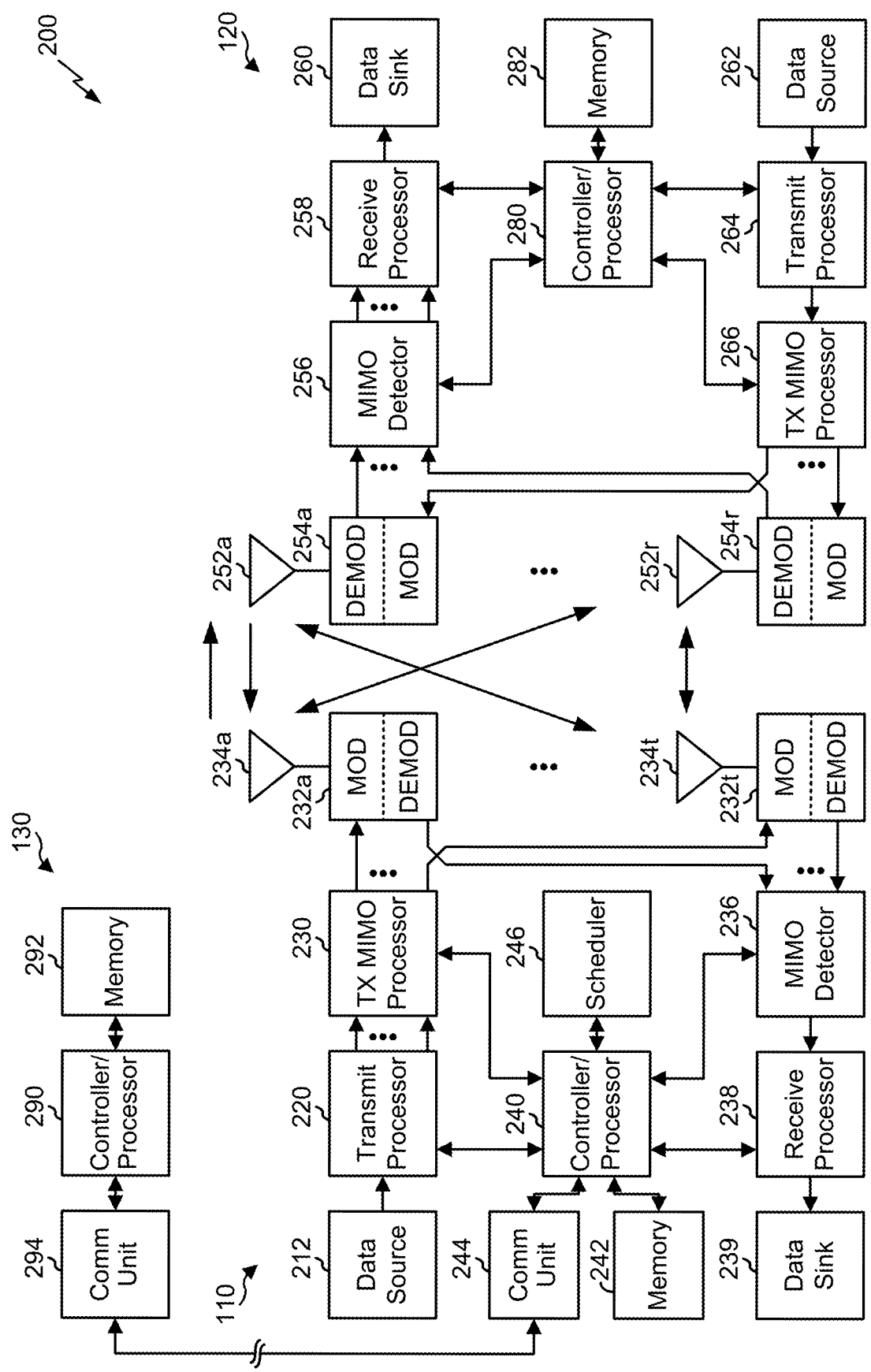
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream.

Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform handling of extended access barring. For example, controller/processor 280 and/or other processors and modules at UE 120, may perform or direct operations of UE 120 to perform handling of extended access barring. For example, controller/processor 280 and/or other controllers/processors and modules at UE 120 may perform or direct operations of, for example, process 1100 of FIG. 11, process 1200 of FIG. 12, and/or other processes as described herein. In some aspects, one or more of the components shown in FIG. 2 may be employed to perform example process 1100, example process 1200, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving extended access barring (EAB) information indicating whether the UE is subject to EAB, means for outputting an indication of whether the UE is subject to EAB based at least in part on receiving the EAB information, and/or the like. Additionally, or alternatively, UE 120 may include means for receiving EAB information indicating that the UE is subject to EAB on a first network, means for transmitting information via a second network based at least in part on receiving the EAB information indicating that the UE is subject to EAB on the first network, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
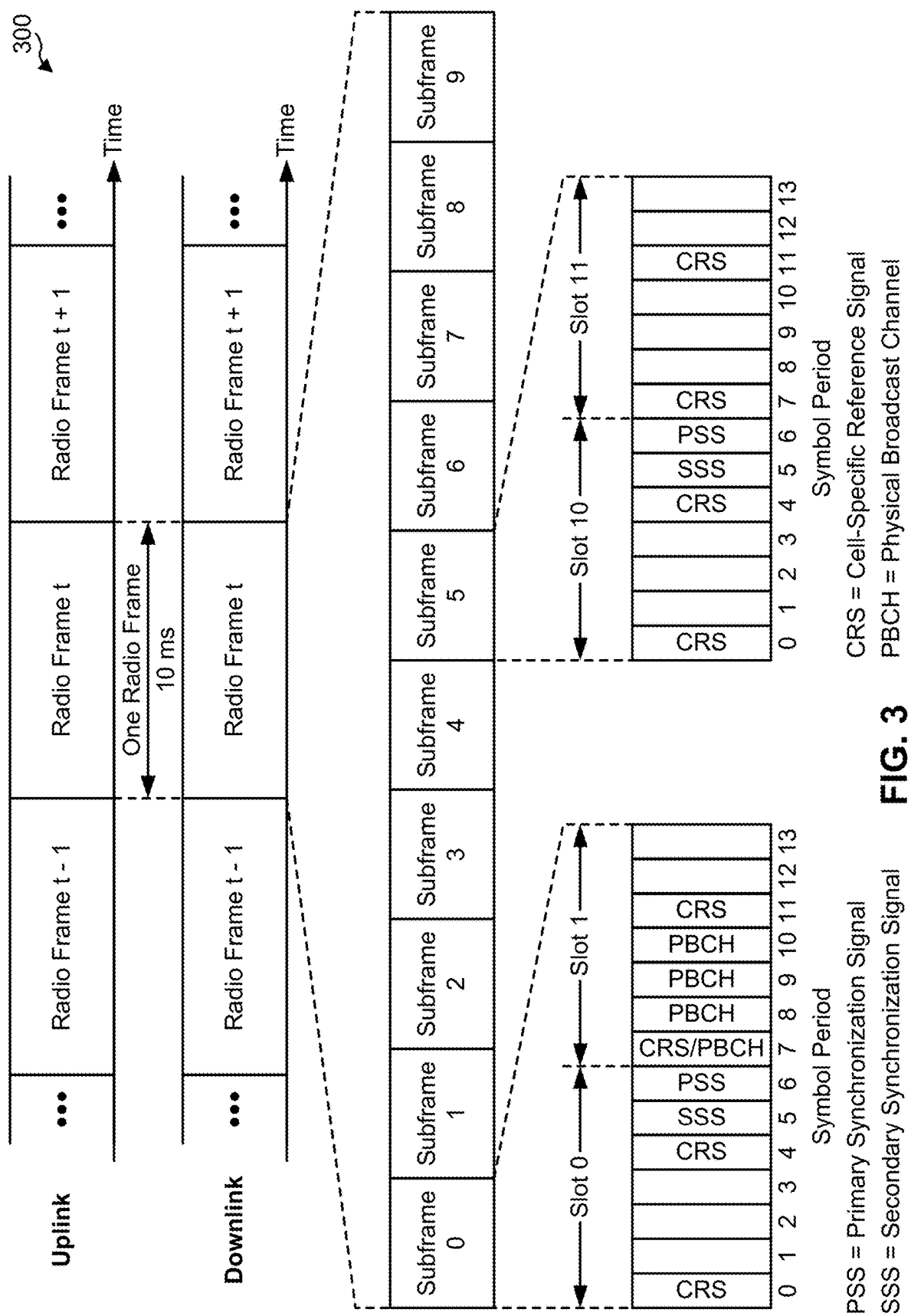
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio may be partitioned into subframes, which may be partitioned into slots. Each slot may include L symbol periods, e.g., seven symbol periods for a normal cyclic prefix (as shown in FIG. 3) or six symbol periods for an extended cyclic prefix.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH). The PBCH may carry some system information. The BS may transmit other system information such as system information blocks (SIBs) on a physical downlink shared channel (PDSCH) in certain subframes. In some aspects, a SIB (e.g., SIB 14) may carry extended access barring information. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
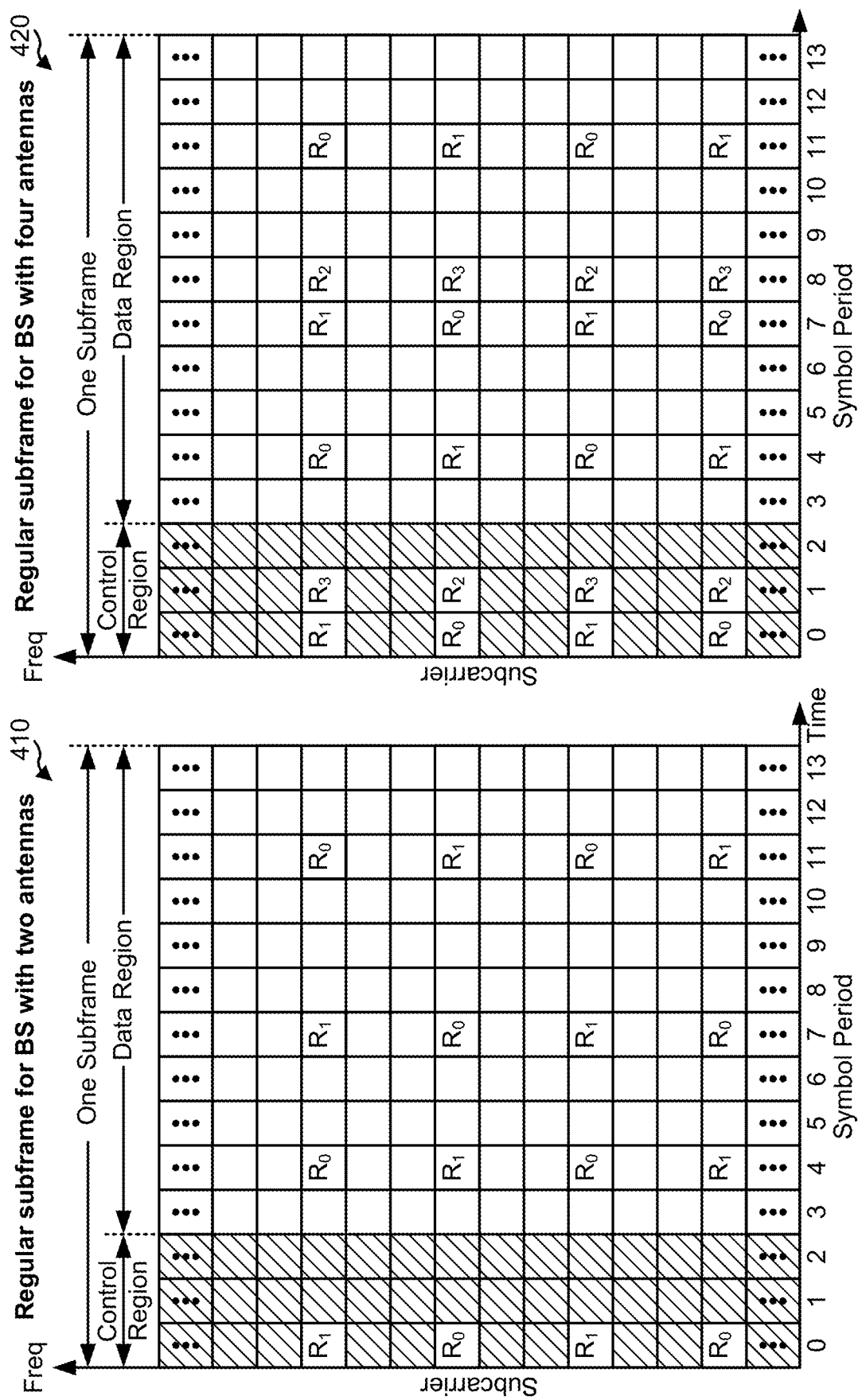
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
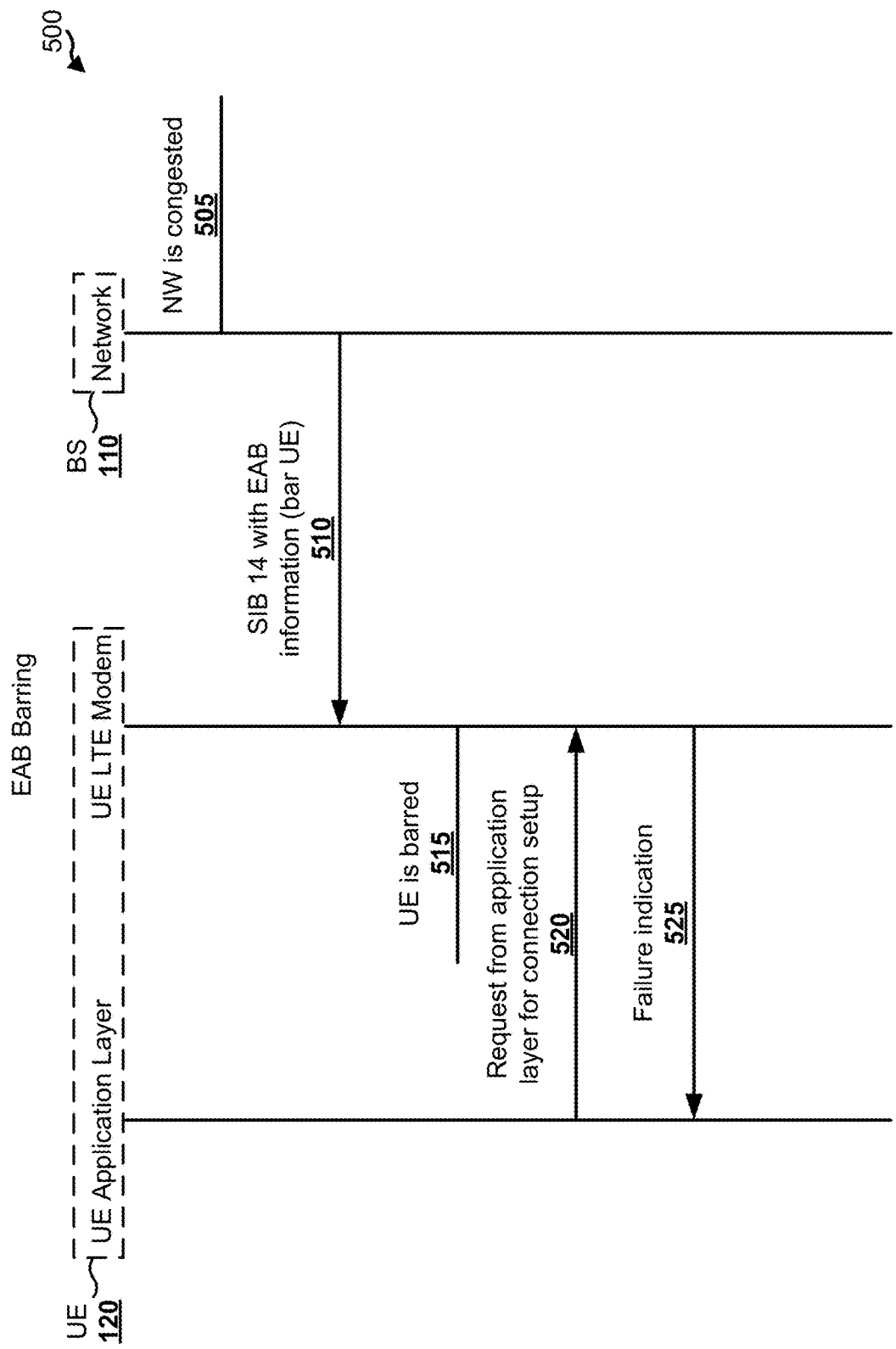
FIGS. 5-10 are diagrams illustrating examples of handling extended access barring (EAB), in accordance with various aspects of the present disclosure.

FIG. 5 is a diagram illustrating an example 500 of handling extended access barring, in accordance with various aspects of the present disclosure. FIG. 5 shows an example of using extended access barring (EAB) to bar a UE 120 from communicating via a network (e.g., a base station 110), such as when the network is congested.

As shown by reference number 505, a base station 110 may determine that a network (e.g., a radio access network provided by the base station 110) is congested. As shown by reference number 510, the base station 110 may broadcast EAB information (e.g., an EAB configuration and/or the like). In some aspects, the base station 110 may broadcast the EAB information in SIB 14 and/or another SIB. For example, SIB 14 may be used to enable or disable EAB for one or more UEs 120. In some aspects, the EAB information may indicate an access class (e.g., a priority) of UEs 120 that are to be barred via EAB. Additionally, or alternatively, the EAB information may indicate a category of UEs 120 that are to be barred via EAB (e.g., all UEs 120, roaming UEs 120, and/or the like). In example 500, because the network is congested, the EAB information includes an indication that the UE 120 is to be barred from transmitting via the network.

As shown by reference number 515, the UE 120 may determine (e.g., at a modem layer of the UE 120) that the UE is barred via EAB. For example, the UE 120 may receive the EAB information (e.g., via SIB 14), and may determine that the UE 120 is barred based at least in part on the EAB information. For example, the EAB information may indicate that all UEs 120 are barred, may indicate that an access class of the UE 120 is barred, may indicate that a category of the UE 120 is barred, and/or the like.

As shown by reference number 520, the UE 120 may provide a request from an upper layer of the UE 120 (e.g., an application layer, a non-access stratum (NAS) layer, and/or the like) to a lower layer associated with a modem of the UE (e.g., a modem layer of the UE 120, a radio resource control (RRC) layer, and/or the like), for a connection setup (e.g., to initiate a call, set up an RRC connection, set up a data connection, and/or the like) while the UE 120 is barred. For example, a user and/or an application may request to initiate a call, to transmit data, and/or the like. A request may then be sent from the application layer to the modem layer to set up a connection.

As shown by reference number 525, because the UE 120 is barred via EAB, the modem layer may indicate a failure to the application layer. In this case, a user and/or an application of the UE 120 may be unable to determine a cause of the failure, and/or may experience a failure without any notification of why the failure occurred. For example, the user may not be aware that the UE 120 is subject to EAB, and may experience an unsuccessful call and/or transmission, thereby resulting in a poor user experience. Furthermore, the user may be unable to determine when the UE 120 is no longer subject to EAB. Some techniques and apparatuses described herein assist with handling EAB, such as to output an indication of whether the UE 120 is subject to EAB, thereby enhancing a user experience and/or improve efficiency of an application executing on the UE 120. Furthermore, some techniques and apparatuses described herein may reduce delay associate with a transmission when the UE 120 is subject to EAB, such as by using another network for the transmission, waiting for a specified time period before trying transmission, and/or the like. Additional details are provided elsewhere herein.

As indicated above, FIG. 5 is provided as an example. Other examples are possible and may differ from what was described with respect to FIG. 5.

Figure 6:
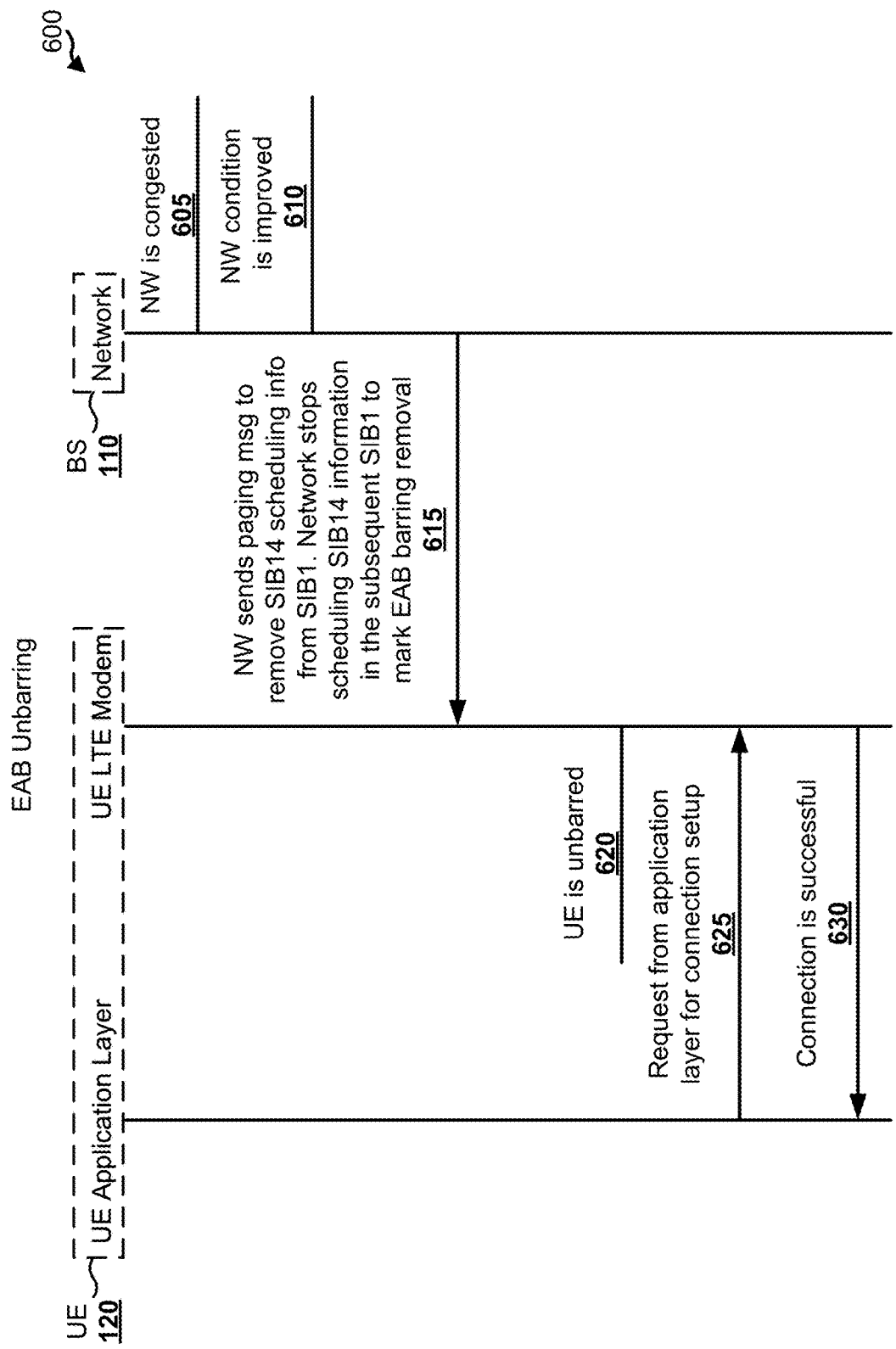

FIG. 6 is a diagram illustrating an example 600 of handling extended access barring, in accordance with various aspects of the present disclosure. FIG. 6 shows an example of using EAB information to unbar a UE 120 from communicating via a network (e.g., a base station 110), such as when the network is no longer congested.

As shown by reference number 605, a base station 110 may determine that a network (e.g., a radio access network provided by the base station 110) is congested. In this case, the base station 110 may use EAB to bar the UE 120 from communicating via the network, as described above in connection with FIG. 5.

As shown by reference number 610, at a later time, the base station 110 may determine that the network condition has improved, and that the network is no longer congested. As shown by reference number 615, the base station 110 may use EAB information to indicate that the UE 120 is no longer barred (e.g., is unbarred). For example, in some aspects, the EAB information may be updated such that an access class, a category, and/or the like of UE 120 is no longer barred. Additionally, or alternatively, the network (e.g., a network device, such as a mobility management entity (MME) and/or the like) may send a paging message to the base station 110 to instruct the base station 110 to remove SIB 14 scheduling information from SIB 1 (and/or scheduling information for another SIB, other than SIB 14, that includes EAB information). In this case, the base station 110 may broadcast SIB 1, which may not include scheduling information for SIB 14. This may indicate that EAB barring has ended (e.g., for all UEs 120).

As shown by reference number 620, the UE 120 may determine (e.g., at a modem layer of the UE 120) that the UE is no longer barred via EAB (e.g., is unbarred). For example, the UE 120 may receive the EAB information (e.g., via SIB 14, via reception of SIB 1 that no longer includes scheduling information for SIB 14, and/or the like), and may determine that the UE 120 is unbarred based at least in part on the EAB information. For example, the EAB information may indicate that all UEs 120 are unbarred, may indicate that an access class of the UE 120 is unbarred, may indicate that a category of the UE 120 is unbarred, and/or the like.

As shown by reference number 625, the UE 120 may provide a request from an application layer of the UE 120 to a modem layer of the UE 120 for a connection setup while the UE 120 is unbarred. For example, a user and/or an application may request to initiate a call, to transmit data, and/or the like. A request may then be sent from the application layer to the modem layer to set up a connection.

As shown by reference number 630, because the UE 120 is not barred via EAB, the modem layer may set up a connection and indicate a successful connection to the application layer. However, a user and/or an application of the UE 120 may be unable to determine when the UE 120 is no longer subject to EAB. This may result in repeated requests for a connection setup, thereby wasting UE resources (e.g., battery power, processing resources, memory resources, and/or the like). Some techniques and apparatuses described herein assist with handling EAB, such as to output an indication of whether the UE 120 is subject to EAB, thereby enhancing a user experience, improving efficiency of an application executing on the UE 120, conserving UE resources, and/or the like. Additional details are provided elsewhere herein.

As indicated above, FIG. 6 is provided as an example. Other examples are possible and may differ from what was described with respect to FIG. 6.

Figure 7:
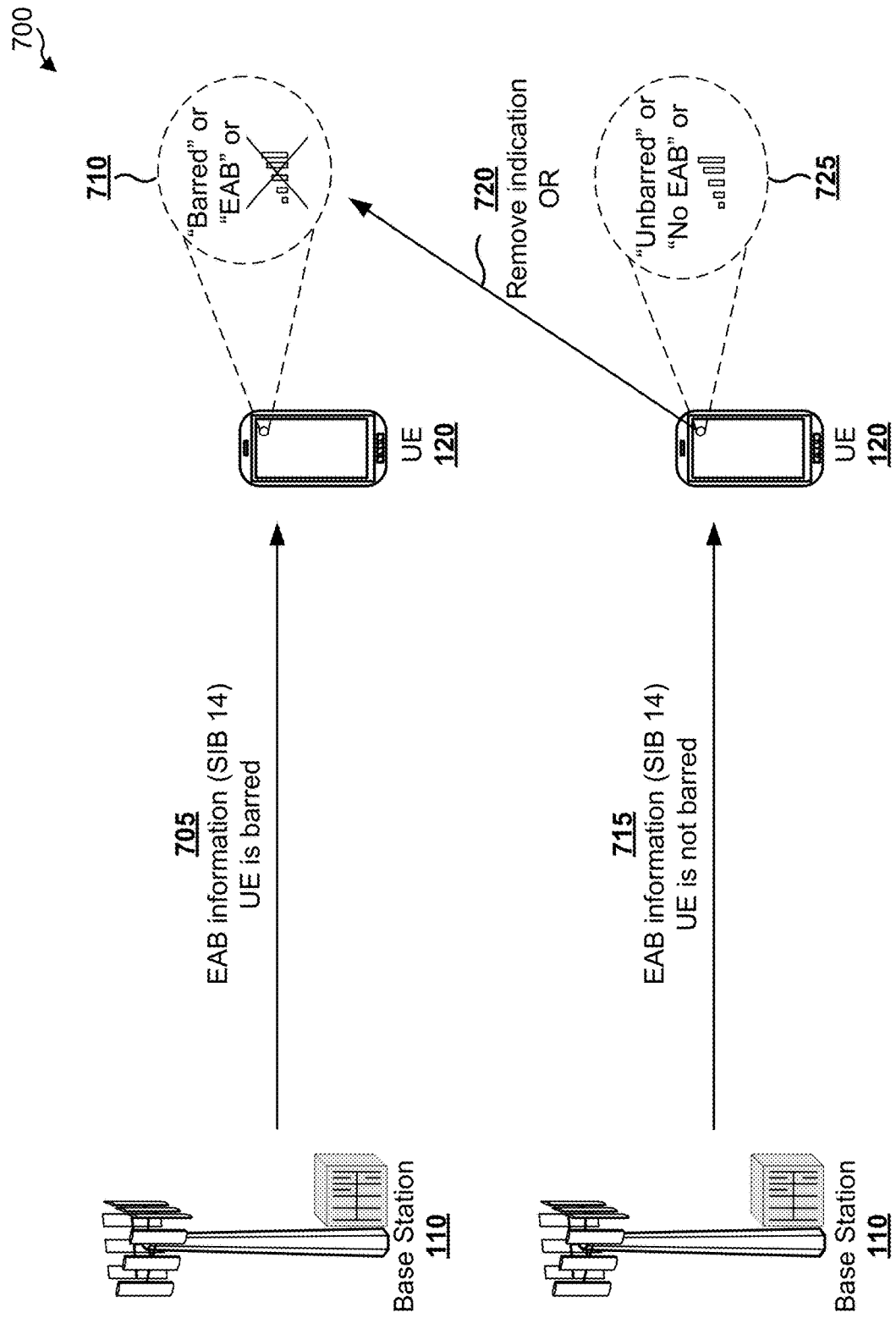

FIG. 7 is a diagram illustrating an example 700 of handling extended access barring, in accordance with various aspects of the present disclosure.

As shown by reference number 705, a base station 110 may transmit, and a UE 120 may receive, EAB information indicating that the UE 120 is subject to EAB (e.g., that the UE is barred). In some aspects, the EAB information may be transmitted and/or received via SIB 14 and/or another SIB.

As shown by reference number 710, the UE 120 may output an indication of whether the UE 120 is subject to EAB based at least in part on receiving the EAB information. In the case where the UE 120 is subject to EAB, the UE 120 may output an indication that the UE 120 is subject to EAB based at least in part on a determination that the EAB information indicates that the UE is subject to EAB. In some aspects, the UE 120 outputs the indication on a display of the UE 120, as shown. For example, the UE 120 may display the word "Barred," may display the acronym "EAB," may display an X over a network connection indicator (e.g., a signal strength indicator), and/or the like, as shown. Additionally, or alternatively, the indication output by the UE 120 may include a visible indication (e.g., output via a display of the UE 120, output via a light or LED, such as by displaying a light in a particular color, blinking the light, and/or the like), an audible indication (e.g., output via a speaker of the UE 120), a tactile indication (e.g., output via vibrating the UE 120), and/or the like.

By outputting an indication that the UE 120 is subject to EAB, the UE 120 may notify a user and/or an application that the UE 120 is subject to EAB. This may conserve UE resources (e.g., battery power, processor resources, memory resources, and/or the like) by preventing a user and/or application from requesting a transmission while the UE 120 is subject to EAB. Furthermore, this may improve a user experience by indicating to the user a reason why a transmission cannot occur.

As shown by reference number 715, the base station 110 may transmit, and the UE 120 may receive, EAB information indicating that the UE 120 is not subject to EAB (e.g., that the UE is not barred or is unbarred). In some aspects, the EAB information may be transmitted and/or received via SIB 14 and/or another SIB. Additionally, or alternatively, the EAB information may be communicating by removing SIB 14 scheduling information (or scheduling information for another SIB that includes EAB information) from SIB 1.

As further shown, the UE 120 may output an indication of whether the UE 120 is subject to EAB based at least in part on receiving the EAB information. In the case where the UE 120 is not subject to EAB, the UE 120 may output an indication that the UE 120 is not subject to EAB based at least in part on a determination that the EAB information indicates that the UE is not subject to EAB. In some aspects, the UE 120 outputs the indication on a display of the UE 120. For example, the UE 120 may remove an indication that the UE 120 is subject to EAB, as shown by reference number 720. Additionally, or alternatively, the UE 120 may display the word "Unbarred," may display the phrase "No EAB," may display a network connection indicator (e.g., a signal strength indicator) without an X, and/or the like, as shown. Additionally, or alternatively, the indication output by the UE 120 may include a visible indication, an audible indication, a tactile indication, and/or the like.

In some aspects, an indication may be output on a display of the UE 120 when the UE 120 is subject to EAB, and may be removed from the display of the UE 120 when the UE 120 is no longer subject to EAB. In this way, a user and/or an application of the UE 120 may be notified of when it is permissible for the UE 120 to transmit information (e.g., initiate a call, send data, and/or the like) via the network, thereby conserving UE resources by only requesting transmissions when the UE 120 is permitted to transmit.

As indicated above, FIG. 7 is provided as an example. Other examples are possible and may differ from what was described with respect to FIG. 7.

Figure 8:
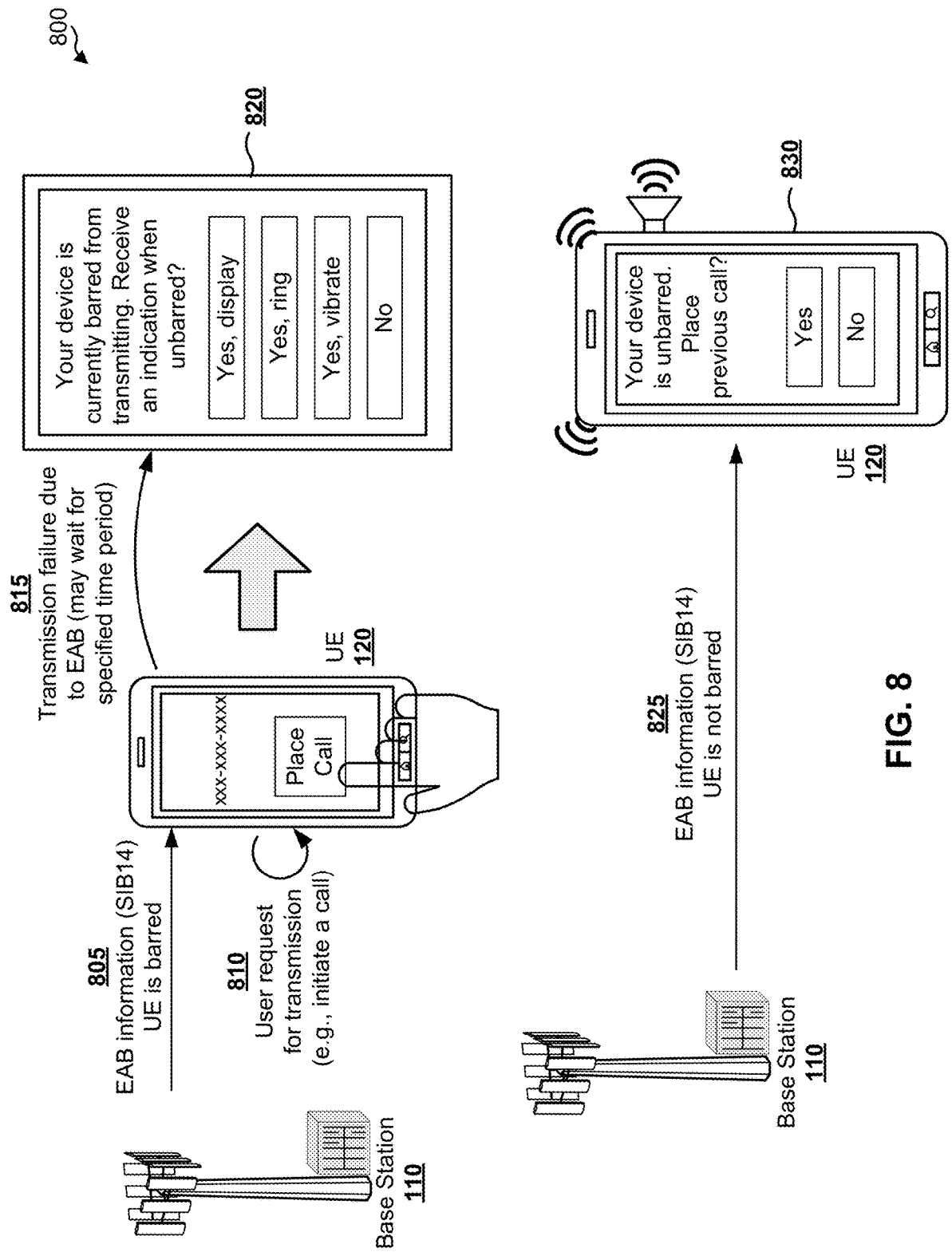

FIG. 8 is a diagram illustrating an example 800 of handling extended access barring, in accordance with various aspects of the present disclosure.

As shown by reference number 805, a base station 110 may transmit, and a UE 120 may receive, EAB information indicating that the UE 120 is subject to EAB (e.g., that the UE is barred), as described above in connection with FIG. 7.

As shown by reference number 810, a user of the UE 120 may request a transmission. For example, the user request may be a request to initiate a call (e.g., where the UE 120 is the mobile originator), a request to transmit data (e.g., by interacting with an application executing on the UE 120), and/or the like. Additionally, or alternatively, an application executing on the UE 120 may request a transmission (e.g., with or without user interaction).

As shown by reference number 815, the transmission may fail because the UE 120 is subject to EAB. For example, an application layer (and/or a NAS layer) of the UE 120 may provide a request for transmission to a modem layer (and/or an RRC layer) of the UE 120, and the modem layer may indicate failure of the transmission because the UE 120 is subject to EAB, as described above in connection with FIG. 5.

In some aspects, after receiving the request for transmission and determining that the UE 120 is subject to EAB, the UE 120 may wait for a specified time period (e.g., one second, two seconds, three seconds, and/or the like) before outputting an indication that the UE 120 is subject to EAB. For example, the UE 120 may wait for the specified time period, and may determine whether EAB has ended for the UE 120 (e.g., may determine whether the UE 120 is unbarred) after the specified time period has elapsed. If EAB has ended for the UE 120, then the UE 120 may transmit the transmission. If EAB has not ended for the UE 120, then the UE 120 may output an indication that the UE 120 is subject to EAB, as described below. Additionally, or alternatively, if EAB has not ended for the UE 120, then the UE 120 may terminate transmission. In this way, UE resources may be conserved by preventing multiple transmission attempts because the transmission may be sent after one attempt if EAB ends during the specified time period, and the user may be notified of EAB to avoid additional transmission attempts while the UE 120 is subject to EAB.

As shown by reference number 820, the UE 120 may output an indication that the UE 120 is subject to EAB, as described above in connection with FIG. 7. In some aspects, the indication may be output based at least in part on the user request (and/or an application request) for the UE 120 to transmit information (e.g., to initiate a call, transmit data, and/or the like). In this way, the user may be provided with feedback as to why the transmission failed, thereby improving a user experience. Furthermore, UE resources may be conserved by preventing repeated requested for additional transmissions while the UE 120 is subject to EAB.

In some aspects, the UE 120 may output the indication using a visible indication, an audible indication, a tactile indication, and/or the like, as described above in connection with FIG. 7. For example, the UE 120 may output the text "Your device is currently barred from transmitting," as shown. Additionally, or alternatively, the UE 120 may provide a user with an option of whether the UE 120 is to output an indication when the UE 120 is unbarred (e.g., when the UE 120 is no longer subject to EAB). Additionally, or alternatively, the UE 120 may provide the user with an option to select a manner in which an indication that the UE 120 is unbarred is output. For example, the UE 120 may provide the user with an option to receive a visible indication (e.g., output via a display of the UE 120), an audible indication (e.g., output by ringing the UE 120), a tactile indication (e.g., output by vibrating the UE 120), and/or the like.

As shown by reference number 825, the base station 110 may transmit, and the UE 120 may receive, EAB information indicating that the UE 120 is no longer subject to EAB. In some aspects, the EAB information may be transmitted and/or received via SIB 14 and/or another SIB. Additionally, or alternatively, the EAB information may be communicating by removing SIB 14 scheduling information (or scheduling information for another SIB that includes EAB information) from SIB 1.

As shown by reference number 830, the UE 120 may output an indication that the UE 120 is no longer subject to EAB. In some aspects, the indication that the UE 120 is no longer subject to EAB may be output after one or more transmission failures due to EAB, as described above in connection with reference number 815. As shown, the indication may be output via a visible indication, an audible indication, a tactile indication, and/or the like. In some cases, the indication that the UE 120 is no longer subject to EAB may be output via an audible indication and/or a tactile indication so that the user can be notified even if the user is not looking at a display of the UE 120.

In some aspects, the UE 120 may provide an option to proceed with a previous request for transmission. For example, if the user indicated a destination for a call (e.g., by indicating a phone number, a contact, and/or the like), the UE 120 may provide an option to re-try the call to that destination. In this case, the UE 120 may store information regarding the request for transmission in memory while the UE 120 is subject to EAB, so that the transmission can be completed when the UE 120 is no longer subject to EAB. In this way, a user experience may be improved and UE resources may be conserved by avoiding re-entry of a phone number for the call, information for the transmission, and/or the like. In some aspects, the UE 120 may proceed with the previous transmission after receiving user input approving the UE 120 to proceed. In some aspects, the UE 120 may automatically proceed with the transmission. In some aspects, a determination to automatically proceed or to wait for user input may be based at least in part on the type of transmission. For example, the UE 120 may wait for user input for a phone call, but may proceed automatically with a data transmission (e.g., a text message and/or the like).

As indicated above, FIG. 8 is provided as an example. Other examples are possible and may differ from what was described with respect to FIG. 8.

Figure 9:
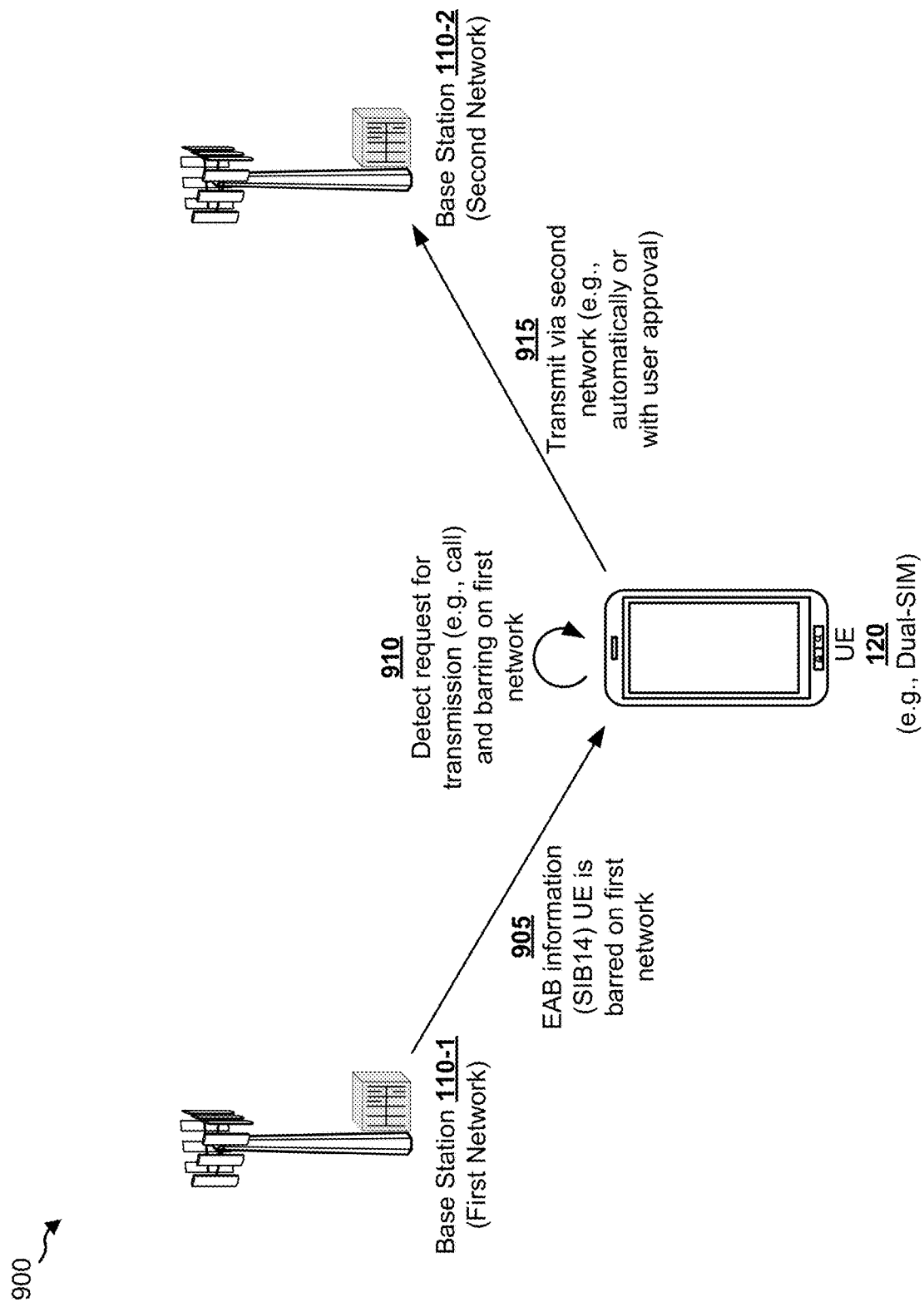

FIG. 9 is a diagram illustrating an example 900 of handling extended access barring, in accordance with various aspects of the present disclosure.

As shown by reference number 905, a first base station 110-1 may transmit, and a UE 120 may receive, EAB information indicating that the UE 120 is subject to EAB on a first network. In some aspects, the EAB information may be transmitted and/or received via SIB 14 and/or another SIB. In some aspects, the UE 120 may be capable of communicating via multiple networks (e.g., a first network, a second network, and/or the like). For example, the UE 120 may be a dual-subscriber identity module (SIM) UE subscribed to a first network and a second network. In some aspects, access to the first network may be provided by the first base station 110-1, and access to the second network may be provided by a second base station 110-2.

As shown by reference number 910, the UE 120 may detect a request for transmission (e.g., a user request, an application request, and/or the like). For example, the UE 120 may detect a request to initiate a call, a request to transmit data, and/or the like. Furthermore, the UE 120 may determine that the UE 120 is barred from transmitting on the first network.

As shown by reference number 915, the UE 120 may transmit information (e.g., the requested transmission) via the second network based at least in part on receiving the EAB information indicating that the UE 120 is subject to EAB on the first network. In this way, the UE 120 may proceed with the transmission despite being barred on the first network, thereby improving a user experience, conserving UE resources by avoiding multiple transmission attempts, and avoiding transmission delays. In some aspects, the UE 120 may wait a specified time period before transmitting via the second network in case the UE 120 becomes unbarred on the first network during the specified time period, in a similar manner as described above in connection with FIG. 8.

In some aspects, the UE 120 may transmit via the second network based at least in part on receiving user input approving the transmission via the second network. For example, the first network may have a higher priority than the second network, and the user may want to be notified before transmitting on the second network (e.g., because additional costs could be incurred, and/or the like). In this case, the UE 120 may output an indication that the UE 120 is barred from transmitting on the first network, may detect that the second network is available for the transmission, and may provide an option for the user to select whether to transmit via the second network. If user input is received approving the transmission via the second network, then the UE 120 may transmit via the second network. If user input is receiving rejecting the transmission via the second network, then the UE 120 may terminate the transmission, and may proceed as described above in connection with FIG. 7 and/or FIG. 8 (e.g., by outputting an indication when the UE 120 is no longer subject to EAB on the first network, and/or the like).

In some aspects, the UE 120 may automatically transmit via the second network without receiving user input approving the transmission via the second network. Additionally, or alternatively, the UE 120 may receive user input to automatically transmit via the second network when the first network is subject to EAB (e.g., without prompting the user each time a transmission request is received while the first network is subject to EAB). By transmitting via the second network when the first network is subject to EAB, the UE 120 may conserve UE resources by avoiding multiple transmission attempts, may avoid transmission delays, may improve a user experience, and/or the like.

As indicated above, FIG. 9 is provided as an example. Other examples are possible and may differ from what was described with respect to FIG. 9.

Figure 10:
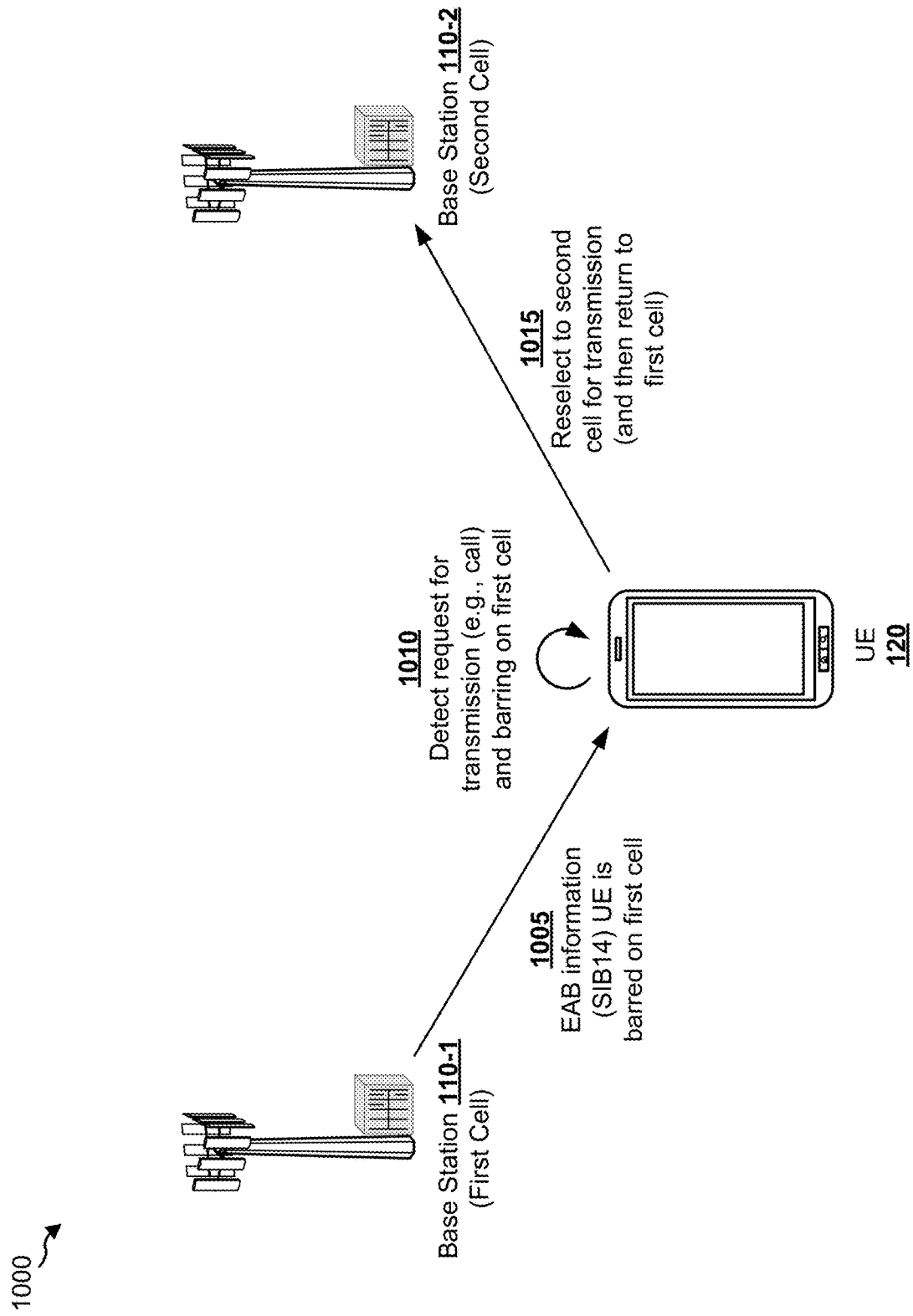

FIG. 10 is a diagram illustrating an example 1000 of handling extended access barring, in accordance with various aspects of the present disclosure.

As shown by reference number 1005, a first base station 110-1 may transmit, and a UE 120 may receive, EAB information indicating that the UE 120 is subject to EAB on a first cell. In some aspects, the EAB information may be transmitted and/or received via SIB 14 and/or another SIB.

As shown by reference number 1010, the UE 120 may detect a request for transmission (e.g., a user request, an application request, and/or the like). For example, the UE 120 may detect a request to initiate a call, a request to transmit data, and/or the like. Furthermore, the UE 120 may determine that the UE 120 is barred from transmitting on the first cell.

As shown by reference number 1015, the UE 120 may perform a cell reselection procedure to select a second cell (e.g., the best available cell other than the first cell or serving cell), and may transmit information (e.g., the requested transmission) via the second cell based at least in part on receiving the EAB information indicating that the UE 120 is subject to EAB on the first cell. In some aspects, the first cell may be provided by a first base station 110-1, and the second cell may be provided by a second base station 110-2, as shown. For example, the first cell and the second cell may be provided by different base stations 110. In some aspects, the first cell and the second cell may be provided by the same base station 110. In some aspects, the UE 120 may reselect the second cell, may transmit the transmission, and may then return to the first cell (e.g., or the best available cell).

Additionally, or alternatively, the UE 120 may determine that the UE 120 is subject to EAB on a first radio access technology (RAT) (e.g., LTE, NR, and/or the like), and may camp on a second RAT (e.g., WCDMA, GSM, and/or the like) for the transmission. In some aspects, the UE 120 may return to the first RAT after completing the transmission. In some aspects, the UE 120 may camp on the second RAT by lowering the priority of the first RAT in a RAT priority list.

In this way, the UE 120 may proceed with the transmission despite being barred on the first cell, thereby improving a user experience, conserving UE resources by avoiding multiple transmission attempts, and/or avoiding transmission delays. In some aspects, the UE 120 may wait a specified time period before transmitting via the second cell in case the UE 120 becomes unbarred on the first cell during the specified time period, in a similar manner as described above in connection with FIG. 8.

As indicated above, FIG. 10 is provided as an example. Other examples are possible and may differ from what was described with respect to FIG. 10.

Figure 11:
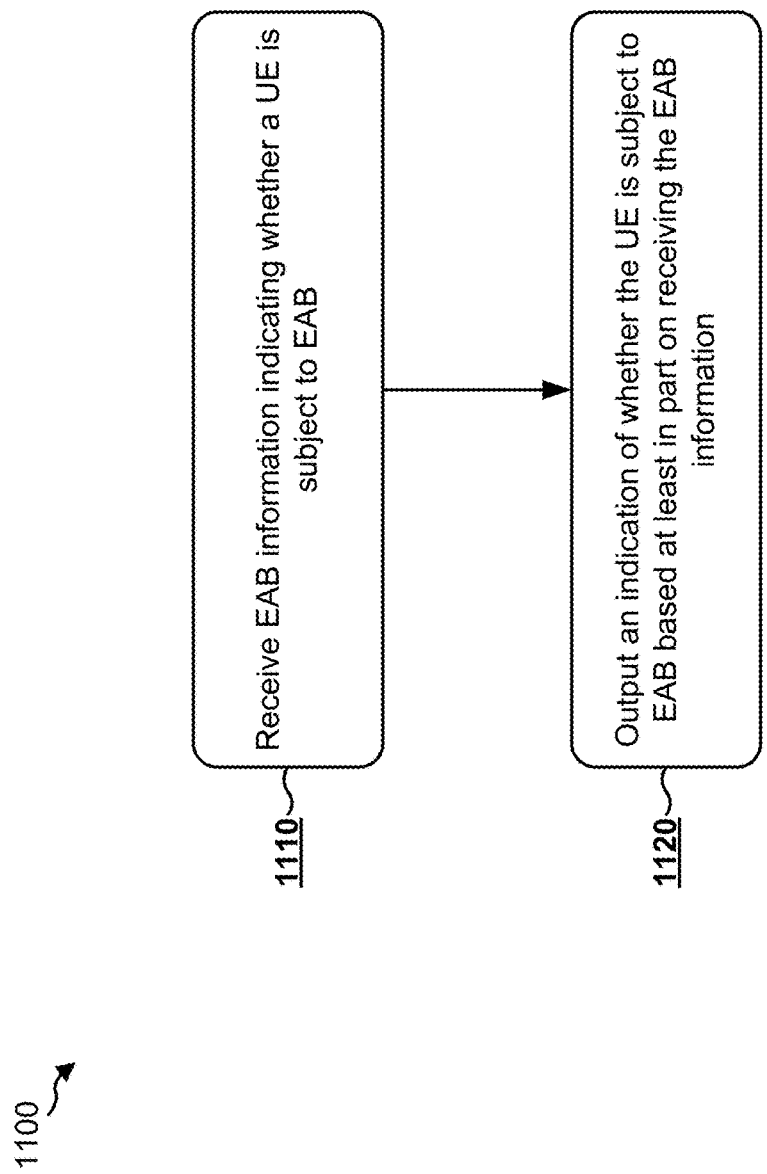
FIGS. 11 and 12 are diagrams illustrating example processes performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs handling of extended access barring.

As shown in FIG. 11, in some aspects, process 1100 may include receiving EAB information indicating whether the UE is subject to EAB (block 1110). For example, the UE may receive EAB information indicating whether the UE is subject to EAB, as described above in connection with FIGS. 5-10.

As further shown in FIG. 11, in some aspects, process 1100 may include outputting an indication of whether the UE is subject to EAB based at least in part on receiving the EAB information (block 1120). For example, the UE may output an indication of whether the UE is subject to EAB, as described above in connection with FIGS. 5-10.

In some aspects, the indication indicates that the UE is subject to EAB based at least in part on a determination that the EAB information indicates that the UE is subject to EAB. In some aspects, the indication indicates that the UE is not subject to EAB based at least in part on a determination that the EAB information indicates that the UE is not subject to EAB.

In some aspects, the indication is output on a display of the UE. In some aspects, the indication is output on the display when the EAB information indicates that the UE is subject to EAB. In some aspects, the indication is removed from the display based at least in part on a determination that the UE is no longer subject to EAB. In some aspects, the indication indicates that the UE is no longer subject to EAB, and is output after one or more transmission failures due to EAB. In some aspects, the indication includes at least one of: a visible indication, an audible indication, a tactile indication, or some combination thereof.

In some aspects, the indication is output based at least in part on a user request for the UE to transmit information. In some aspects, the user request is a request to initiate a call. In some aspects, the indication is output after waiting for a specified time period after receiving the user request and determining that EAB has not ended for the UE after the specified time period has elapsed. In some aspects, transmission of information associated with the user request is terminated after waiting for a specified time period after receiving the user request and determining that EAB has not ended for the UE after the specified time period has elapsed.

In some aspects, the EAB information is associated with a first network to which the UE is subscribed, and the UE is configured to transmit via a second network to which the UE is subscribed based at least in part on determining that the UE is subject to EAB on the first network. In some aspects, the UE is configured to transmit via the second network based at least in part on receiving user input approving transmission via the second network. In some aspects, the UE is configured to transmit via the second network without receiving user input approving transmission via the second network.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
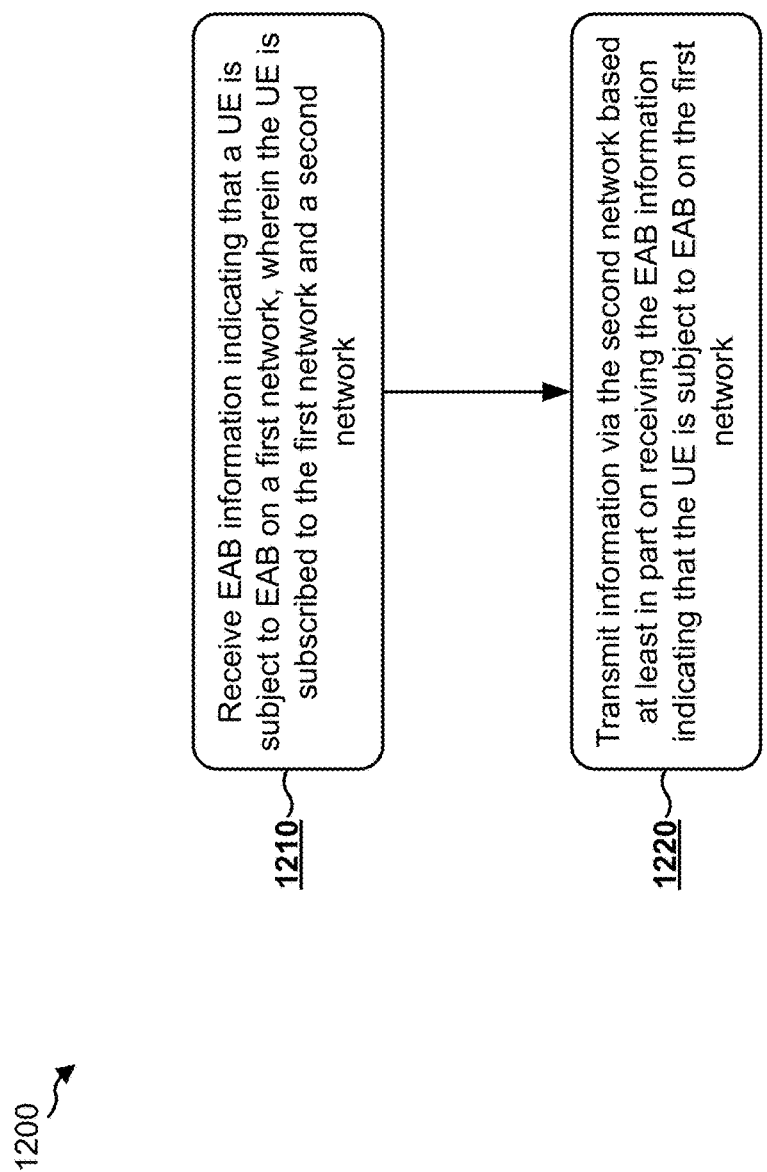

FIG. 12 is a diagram illustrating an example process 1200 performed, for example, by a UE, in accordance with various aspects of the present disclosure. Example process 1200 is an example where a UE (e.g., UE 120 and/or the like) performs handling of extended access barring.

As shown in FIG. 12, in some aspects, process 1200 may include receiving EAB information indicating that the UE is subject to EAB on a first network, wherein the UE is subscribed to the first network and a second network (block 1210). For example, the UE may receive EAB information indicating that the UE is subject to EAB on a first network, as described above in connection with FIGS. 5-10. In some aspects, the UE is subscribed to the first network and a second network.

As further shown in FIG. 12, in some aspects, process 1200 may include transmitting information via the second network based at least in part on receiving the EAB information indicating that the UE is subject to EAB on the first network (block 1220). For example, the UE may transmit information via the second network based at least in part on receiving the EAB information indicating that the UE is subject to EAB on the first network, as described above in connection with FIGS. 5-10.

In some aspects, the UE is configured to transmit via the second network based at least in part on receiving user input approving transmission via the second network. In some aspects, the UE is configured to transmit via the second network without receiving user input approving transmission via the second network. In some aspects, the UE may output an indication that the UE is subject to EAB on the first network based at least in part on receiving the EAB information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, extended access barring (EAB) information indicating whether the UE is subject to EAB;
   outputting, on a display of the UE, an indication of whether the UE is subject to EAB based at least in part on receiving the EAB information;
   receiving other EAB information indicating that the UE is not subject to EAB; and
   removing, from the display of the UE, the indication based on the other EAB information indicating that the UE is not subject to EAB.

2. The method of claim 1, wherein the indication indicates that the UE is subject to EAB based at least in part on a determination that the EAB information indicates that the UE is subject to EAB.

3. The method of claim 1, wherein the indication indicates that the UE is not subject to EAB based at least in part on a determination that the EAB information indicates that the UE is not subject to EAB.

4. The method of claim 1, wherein the indication is output on the display when the EAB information indicates that the UE is subject to EAB.

5. The method of claim 4, wherein the indication is removed from the display based at least in part on a determination that the UE is no longer subject to EAB.

6. The method of claim 1, wherein the indication indicates that the UE is no longer subject to EAB, and is output after one or more transmission failures due to EAB.

7. The method of claim 1, wherein the indication includes at least one of:
   a visible indication,
   an audible indication,
   a tactile indication, or
   some combination thereof.

8. The method of claim 1, wherein the indication is output based at least in part on a user request for the UE to transmit information.

9. The method of claim 8, wherein the user request is a request to initiate a call.

10. The method of claim 8, wherein the indication is output after waiting for a specified time period after receiving the user request and determining that EAB has not ended for the UE after the specified time period has elapsed.

11. The method of claim 8, wherein transmission of information associated with the user request is terminated after waiting for a specified time period after receiving the user request and determining that EAB has not ended for the UE after the specified time period has elapsed.

12. The method of claim 1, wherein the EAB information is associated with a first network to which the UE is subscribed, and the UE is configured to transmit via a second network to which the UE is subscribed based at least in part on determining that the UE is subject to EAB on the first network.

13. The method of claim 12, wherein the UE is configured to transmit via the second network based at least in part on receiving user input approving transmission via the second network.

14. The method of claim 12, wherein the UE is configured to transmit via the second network without receiving user input approving transmission via the second network.

15. The method of claim 1, wherein the indication is a word, an acronym, or a symbol that indicates that the UE is subject to EAB.

16. The method of claim 1, further comprising:
    outputting, on the display of the UE and based on the other EAB information indicating that the UE is not subject to EAB, another indication indicating that the UE is not subject to EAB.

17. The method of claim 1, further comprising:
    receiving a request for transmission; and
    determining that the UE is subject to EAB based at least in part on receiving the EAB information,
    wherein the indication is output on the display after receiving the request for transmission and determining that the UE is subject to EAB.

18. The method of claim 1, further comprising:
    providing an option for the UE to output another indication when the UE is unbarred.

19. The method of claim 1, further comprising:
    providing an option to select a manner in which another indication that the UE is unbarred is output.

20. The method of claim 1, further comprising:
    providing, after receiving the other EAB information indicating that the UE is not subject to EAB, an option to proceed with a previous request for transmission.

21. A user equipment (UE) for wireless communication, comprising:
    a memory; and
    one or more processors operatively coupled to the memory, the memory and the one or more processors configured to:
    receive, from a base station, extended access barring (EAB) information indicating whether the UE is subject to EAB;

output, on a display of the UE, an indication of whether the UE is subject to EAB based at least in part on receiving the EAB information;

receive other EAB information indicating that the UE is not subject to EAB; and remove, from the display of the UE, the indication based on the other EAB information indicating that the UE is not subject to EAB.

22. The UE of claim 21, wherein the indication is output on the display when the EAB information indicates that the UE is subject to EAB.

23. The UE of claim 22, wherein the indication is removed from the display based at least in part on a determination that the UE is no longer subject to EAB.

24. The UE of claim 21, wherein the indication indicates that the UE is no longer subject to EAB, and is output after one or more transmission failures due to EAB.

25. The UE of claim 21, wherein the indication is output based at least in part on a user request for the UE to transmit information.

26. The UE of claim 25, wherein the indication is output after waiting for a specified time period after receiving the user request and determining that EAB has not ended for the UE after the specified time period has elapsed.

27. The UE of claim 21, wherein the EAB information is associated with a first network to which the UE is subscribed, and the UE is configured to transmit via a second network to which the UE is subscribed based at least in part on determining that the UE is subject to EAB on the first network.

28. The UE of claim 21, wherein the one or more processors are further configured to:

provide an option to select a manner in which another indication that the UE is unbarred is output.

29. The UE of claim 21, wherein the one or more processors are further configured to:

provide, after receiving the other EAB information indicating that the UE is not subject to EAB, an option to proceed with a previous request for transmission.

30. The UE of claim 21, wherein the indication is a word, an acronym, or a symbol that indicates that the UE is subject to EAB.

* * * * *